INVENTORS
ROBERT V. MUFFLEY
THEODORE F. FLAVIN
BY F. W. Lowenitzer
ATTORNEY

Dec. 5, 1961 R. V. MUFFLEY ET AL 3,011,611

CLUTCHING MECHANISMS HAVING ACCELERATION AND DECELERATION OPERATIONS

Filed Oct. 3, 1957 8 Sheets-Sheet 2

INVENTORS
ROBERT V. MUFFLEY
THEODORE F. FLAVIN
BY F. W. Lounitzer
ATTORNEY

Dec. 5, 1961

R. V. MUFFLEY ET AL 3,011,611

CLUTCHING MECHANISMS HAVING ACCELERATION AND DECELERATION OPERATIONS

Filed Oct. 3, 1957

8 Sheets-Sheet 3

INVENTORS
ROBERT V. MUFFLEY
THEODORE F. FLAVIN

BY J. W. Lonnitzer
ATTORNEY

INVENTOR.
ROBERT V. MUFFLEY
THEODORE F. FLAVIN

BY F. W. Lowenitzer
ATTORNEY

Dec. 5, 1961 R. V. MUFFLEY ET AL 3,011,611

CLUTCHING MECHANISMS HAVING ACCELERATION AND DECELERATION OPERATIONS

Filed Oct. 3, 1957 8 Sheets-Sheet 5

INVENTORS
ROBERT V. MUFFLEY
THEODORE F. FLAVIN

BY F. W. Lowenitzer [signature]
ATTORNEY

INVENTORS
ROBERT V. MUFFLEY
THEODORE F. FLAVIN
BY F. W. Lonnitzer
ATTORNEY

Dec. 5, 1961 R. V. MUFFLEY ET AL 3,011,611

CLUTCHING MECHANISMS HAVING ACCELERATION AND DECELERATION OPERATIONS

Filed Oct. 3, 1957 8 Sheets-Sheet 7

INVENTORS
ROBERT V. MUFFLEY
THEODORE F. FLAVIN
BY J. W. Lounitzer
ATTORNEY

Dec. 5, 1961 R. V. MUFFLEY ET AL 3,011,611

CLUTCHING MECHANISMS HAVING ACCELERATION AND DECELERATION OPERATIONS

Filed Oct. 3, 1957 8 Sheets-Sheet 8

INVENTORS.
ROBERT V. MUFFLEY
THEODORE F. FLAVIN

BY J. W. Lorenitzer

ATTORNEY 3,011,611

CLUTCHING MECHANISMS HAVING ACCELERATION AND DECELERATION OPERATIONS

Robert V. Muffley, Los Altos, Calif., and Theodore F. Flavin, Vestal, N.Y., assignors to International Business Machines Corporation, New York, N.Y., a corporation of New York Filed Oct. 3, 1957, Ser. No. 688,044
10 Claims. (Cl. 192—147)

This invention relates to selectively controlled clutch mechanisms and particularly to the type which provides for the clutching of a drive shaft to a driven shaft smoothly and without any shock to the driven shaft when the driven shaft is clutched to the drive shaft, or declutched therefrom.

In prior art clutching devices of certain types it has been the practice to clutch a drive shaft to a driven shaft while the drive shaft is rotating at the driving speed with the result that the sudden change in velocity of the driven shaft (usually from zero or rest) imparts a shock to the driven shaft and the load mechanism driven thereby. The sudden declutching of the two shafts brings the driven shaft to zero velocity almost instantaneously but the momentum and inertia it has acquired is a factor that requires consideration and is usually overcome by the provision of devices to lock or control the driven shaft at the moment the driven shaft is declutched.

The present clutch mechanism relates to and discloses a construction which is regarded as a major improvement over certain prior mechanisms in providing a smooth and shockless connection and disconnection of the drive and driven shaft, and in this respect is an improvement over the previous arrangement shown in the patent to T. F. Flavin, No. 2,777,552, issued January 15, 1957.

The principal object of the present invention is the provision of selectively controlled clutching mechanisms to couple or clutch a driven shaft to a drive shaft without impact of a sudden velocity change to the driven shaft, while maintaining cyclic synchronism between both shafts.

A still further object of the invention is the provision of selectively ocntrolled declutching mechanism for uncoupling the driven shaft from the drive shaft in a smooth operation, and without shock to the driven shaft.

More specifically it is an object of the invention to provide an acceleration mechanism driven by the drive shaft and a separate deceleration mechanism driven by the drive shaft and except during complete cycles of operation when both shafts are directly connected for constant synchronous operation, selectively connect each of said mechanisms to the driven shaft. The result of this arrangement is the provision of a clutching mechanism which accelerates a driven shaft from a zero or rest position to the speed or velocity of the drive shaft, thereafter connects the drive and driven shaft for constant synchronous speed of rotation, and at the termination of such synchronous speed of rotation connects the deceleration mechanism to the driven shaft to decelerate the driven shaft gradually to zero to its ultimate disconnection.

In the attainment of the object of the invention the machine is provided with what is known or designated as a multiple pawl controlled driving device. One of said pawls known herein as the acceleration pawl is driven by the acceleration mechanism and is connected to the other pawl which is carried by a part rotatable with the driven shaft. Through a selective interconnection of said other pawl with the acceleration pawl the latter drives the driven shaft at an accelerated speed; up to the extent of maximum acceleration imparted by the acceleration mechanism. Thereafter, there is, due to the position of the part rotatable with the driven shaft and the fact that both shafts are now at synchronous speeds, an automatic connection of said other pawl with a drive disk driven by the drive shaft. This connection results in the synchronous speed of rotation of the driven shaft for one or more cyclic operations. The deceleration mechanism is conditioned to operate each cycle but is selectively connected to said driven shaft with the result that the driven shaft is decelerated to zero gradually and without shock in its gradual change in velocity to zero.

Additional features of construction and an object of the invention is the provision of a separate acceleration mechanism and deceleration mechanism with the provision of means to selectively connect the aceleration mechanism to the driven shaft during the first cycle of operation, to provide means to automatically disconnect the acceleration mechanism after its utilization in said first cycle of operation, and to automatically condition the deceleration mechanism for selective utilization when said driven shaft is to be decelerated to zero.

It is to be understood that the preferred form of clutching mechanism constructed according to the present invention embodies all of the aforedescribed features, i.e. the acceleration mechanism, deceleration mechanism and constant synchronous speed drive. It is very likely that in other embodiments some of these features may be employed independently of others and accordingly the showing of all of them should not be regarded as restrictive of the present invention.

As the description is understood it will be seen that the improved clutching mechanism admirably fulfills all of the objects of the invention. The construction lends itself to high speed operations sufficient to operate card feeding mechanism smoothly and without jars or shock to the load at a very high speed from 800 to 1,000 cards per minute. However, it is not limited to employment in a card feeding mechanism and it may be employed for a variety of other purposes.

Other objects of the invention will be pointed out in the following description and claims and illustrated in the accompanying drawings, which disclose, by way of example, the principle of the invention and the best mode, which has been contemplated, of applying that principle.

Figure 1:
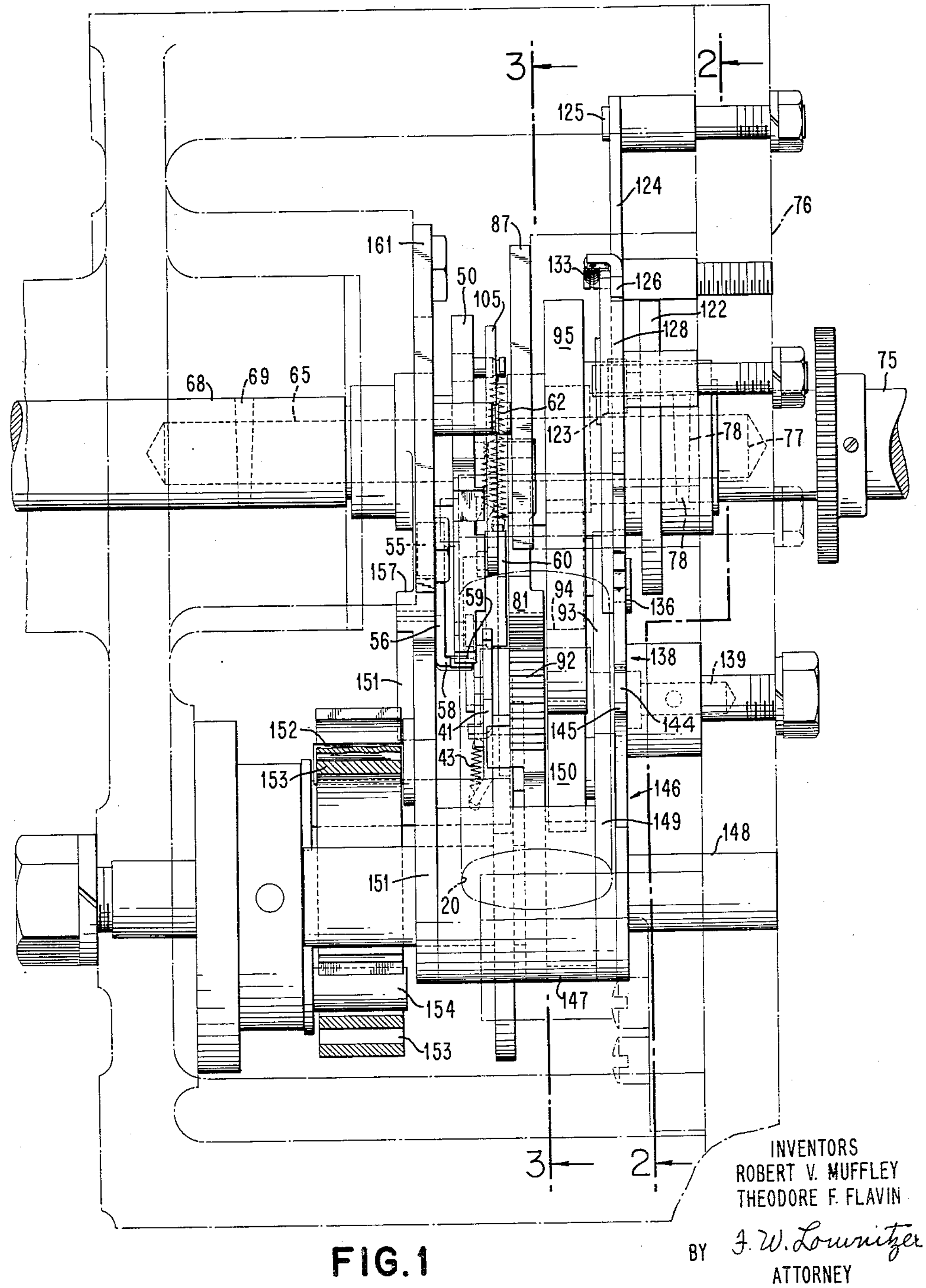
FIG. 1 is a view in front elevation showing the improved clutch mechanism centrally interposed between an input or drive shaft at the right and the output or driven shaft at the left.

1. *Initiation of operation of clutch mechanism*

The selective initiation of the operation of the clutch mechanism to go through an acceleration, constant speed and deceleration operation can be effected by any suitable mechanical or electrical means and herein an electrical control means, such as magnets 20 (FIGS. 2, 3, 8, and 11) are preferably employed. As shown in the timing diagram of FIG. 12 the magnets 20 are energized by a pulse transmitted between 253°–315°. A reduced voltage is also transmitted to the magnets 20 before and after pulse time, and terminated at 124° of "machine time." Herein machine time is the cycle of operation of the main drive shaft 75.

The armature plate 21 of the clutch control magnets 20 is pivoted on a rod 22. When the magnets 20 are energized said armature is rocked clockwise about its pivots 22 against the action of a restoring spring 23. Projecting from said armature plate is a short tine 24 (see FIG. 4) and a longer tine 25, the shorter tine 24 carrying a pivot stud 26, and the longer tine 25 being formed with a long concentric notch 28 (see FIG. 3) and a second shorter concentric notch 29 open to the top edge of the tine 25. Both of said notches are concentric with respect to drive shaft 75 for a purpose to be explained. When said armature is rocked clockwise certain mechanisms are operated thereby, as will now be described.

Figure 4:
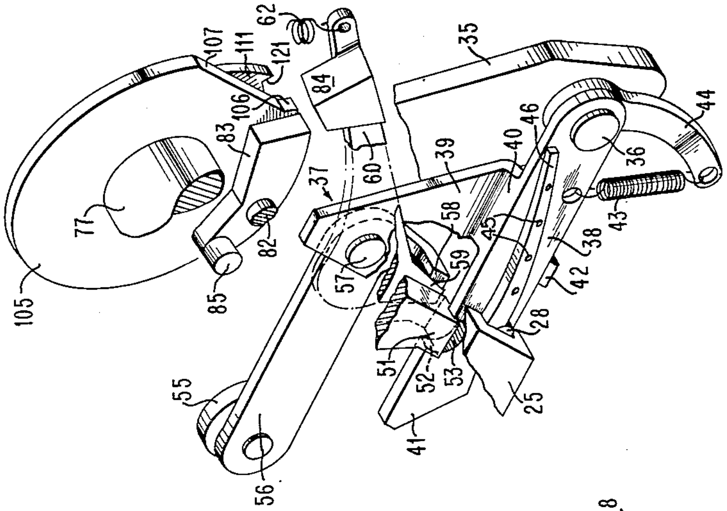
FIG. 4 is a perspective view showing more clearly the selective clutch devices utilized for clutching the drive and driven shafts to drive the latter at an accelerated speed and thereafter at the constant speed of the drive shaft.
Figure 5:
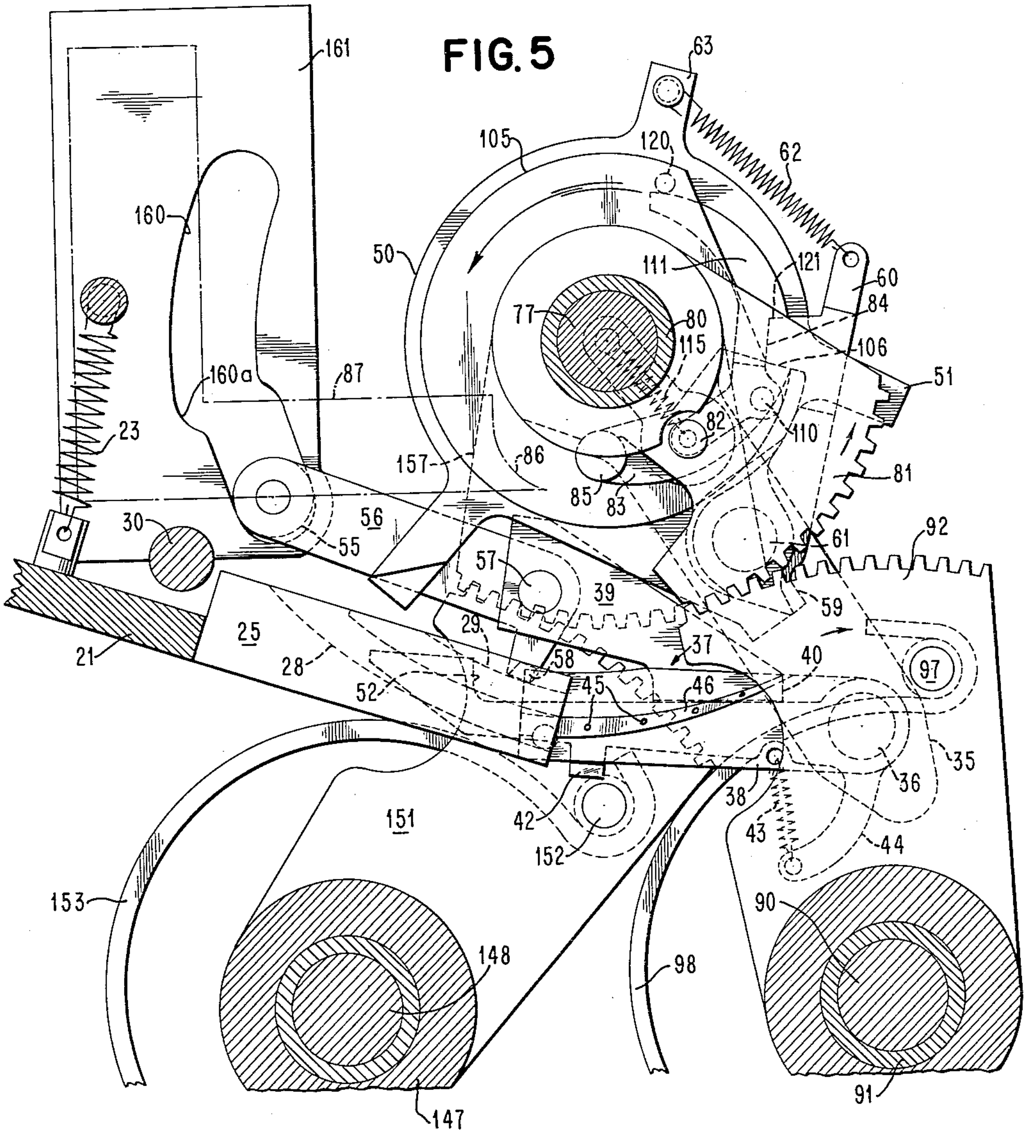
FIG. 5 is a transverse sectional view similar to FIG. 3 but showing the position the parts assume after the acceleration mechanism has accelerated the driven shaft from rest and the drive shaft is directly coupled with the driven shaft to cause the latter to be driven at a speed synchronous with the drive shaft.
Figure 6:
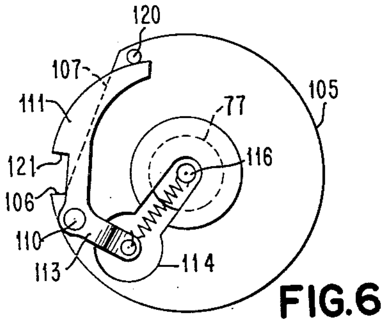
FIG. 6 is a detail view in side elevation.
Figure 7:
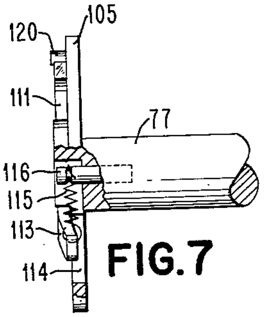
FIG. 7 is a plan view of the parts shwn in FIG. 6 in detail.

An arm 35 is loosely pivoted on a shaft 77 which is an extension of drive shaft 75 and at the time the clutch is engaged for an acceleration operation is in the position shown in FIG. 5. Pivoted on a stud 36 carried by the end of the arm 35 (see also FIG. 4) is a plate 37 having an arm 38 and an upstanding bracket plate 39 which is in a different plane than the arm 38 due to the offset or bent portion 40 between arm 38 and bracket plate 39. Also pivoted on stud 36 is a detent arm 41 having a lug 42 underneath the lower edge of the arm 38. A spring 43 is interposed between the arm 38 and a curved extension 44 of the detent arm 41 to retain the arm 38 against the lug 42, whereby both operate as a unit, or independently.

To one side of the arm 38 there is attached by rivets 45 or welding an actuating cam plate 46 which is adapted to fit in the curved recess 28 of the tine 25. As shown in FIGS. 4 and 5 the left end of the cam plate 46 is in the curved recess 28 when acceleration is to be initiated. When the armature 21 is rocked clockwise the fitting of the left end of cam plate 46 in the curved recess 28 causes the tine 25 to rock arm 38 counterclockwise and since arm 38 overlies the lug 42 the detent arm 41 is also rocked in a counterclockwise direction.

In FIG. 1 there will be seen that secured to a driven shaft 65, which is in axial alignment with the drive shaft 75 or 77, is an irregular shaped plate 50 and at the time the acceleration operation is initiated, a depending extension 51 of plate 50 is latched between the shoulder 52 (FIGS. 3 and 4) of a notch 53 of the detent arm 41 and the extremity of the arm 38. It will be evident then that the concomitant rocking of the arm 38 and detent arm 41 will disengage both from the extension 51 to unlatch the irregular shaped plate 50.

Figure 3:
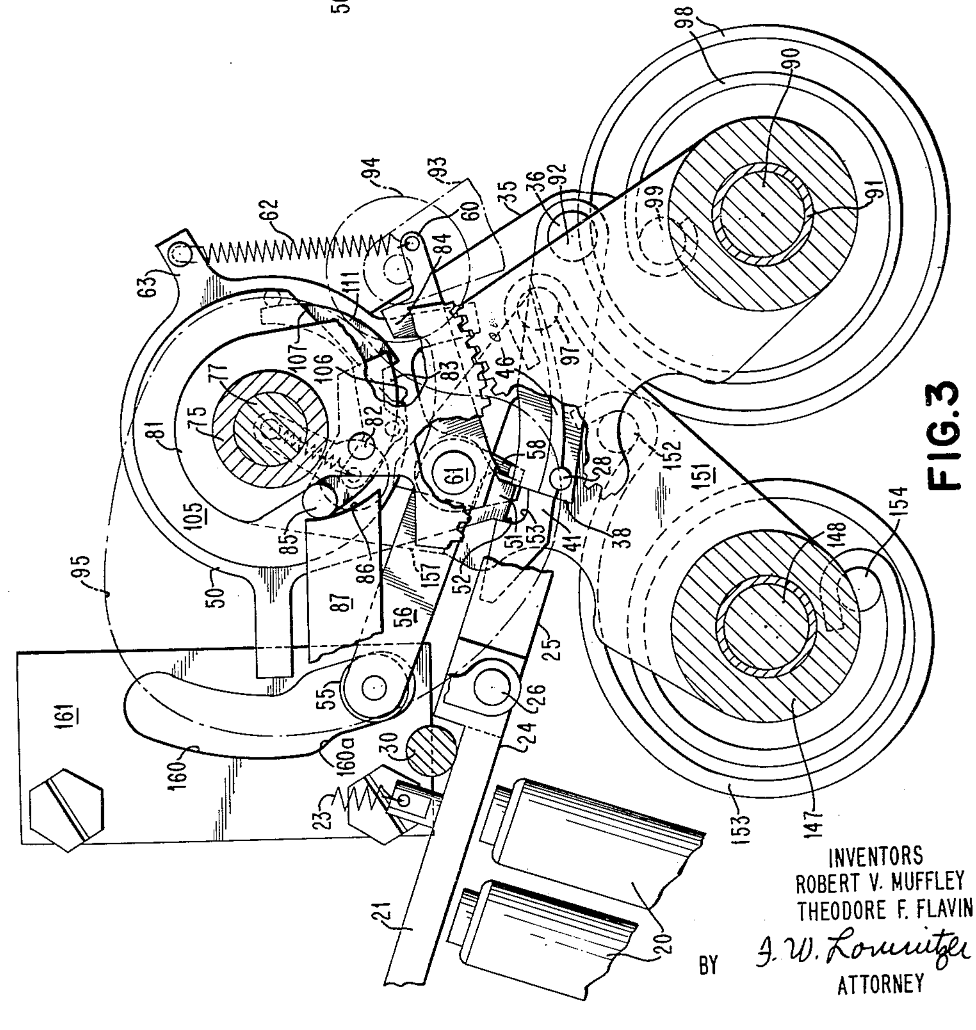
FIG. 3 is a transverse sectional view taken on the line 3—3 of FIG. 1 with the parts shown as they would be at 315° machine time corresponding to FIG. 2.

Pivoted on a stud 55 which is stationary and in the position shown in FIGS. 3 and 4 at the time the magnets 20 are energized, is a clutch pawl release arm 56 having a pivot connection to the bracket plate 39 by a stud 57 carried by said bracket plate; whereby the rocking of clutch pawl release arm 56 clockwise will lower its lug 58 to free it from a depending extension 59 (FIG. 4) of a clutch pawl 60. The clutch pawl 60 is pivoted on a stud 61 carried by the plate 50. A spring 62 is interposed between the free end of the clutch pawl 60 and a stud fixed to an extension 63 of the plate 50, whereby said clutch pawl 60 is rocked counterclockwise, as viewed in FIGS. 3 and 4.

Summarizing, the energization of the magnets 20 cause the detent arm 41 to be rocked to unlatch plate 50 for clockwise rotation, and to also release the clutch pawl 60 for counterclockwise rotation for initiating an accelerating operation to be presently described.

The plate 50 has clutched to it, as will be described in order, the acceleration mechanism, the constant speed drive mechanism and the deceleration mechanism. In order that a shaft may be conveniently used for load driving purposes staked to the plate 50 is said shaft 65. Shaft 65 is received by a central hole of a larger shaft 68 and is affixed thereto by a tapered pin 69 (FIG. 1). Shaft 68 may be designated as the driven shaft and is connected to the load.

Drive shaft 75 (FIG. 1) is in axial alignment with driven shaft 68. A central hole receives the shaft 77 which is pinned by a pin 78 (FIG. 1) to the constantly rotating drive shaft 75 and provides an extension of the drive shaft 75 to support or drive certain members.

Shaft 75 (FIG. 1) drives the driven shaft 68 from rest at an accelerated speed, then to a constant speed consonant with the speed of the drive shaft 75, and repetitions of constant speed drive until the desired number of constant speed rotations have been obtained, at which time driven shaft 68 is decelerated to a stop position.

2. *Acceleration of driven shaft 68 from rest to speed of drive shaft 75*

A segment 81 loosely mounted on said shaft 77 has affixed thereto a pivot stud 82 (see FIGS. 3, 4 and 5). Pivoted on said stud 82 is an acceleration pawl 83 which is moved in a concentric path about shaft 77 by the segment rack 81, and the latter in turn is rocked by the acceleration mechanism, as will be explained. The acceleration pawl is so positioned on segment rack 81 that when the clutch pawl 60 is unlatched a projection 84 thereof will be directly in front of the end of acceleration pawl 83. The tail of the acceleration pawl 83 carries a stud 85. The acceleration pawl 83 is loosely mounted on stud 82 but when segment rack 81 is rocked counterclockwise it is held in a position abutting the projection 84 by said stud 85 bearing against a curved cam edge 86 of a stationary cam plate 87. This provides a firm driving relationship between acceleration pawl 83 and clutch pawl 60 during the operation of the acceleration mechanism. The latter is driven by the drive shaft 75 by means now to be explained.

Figure 2:
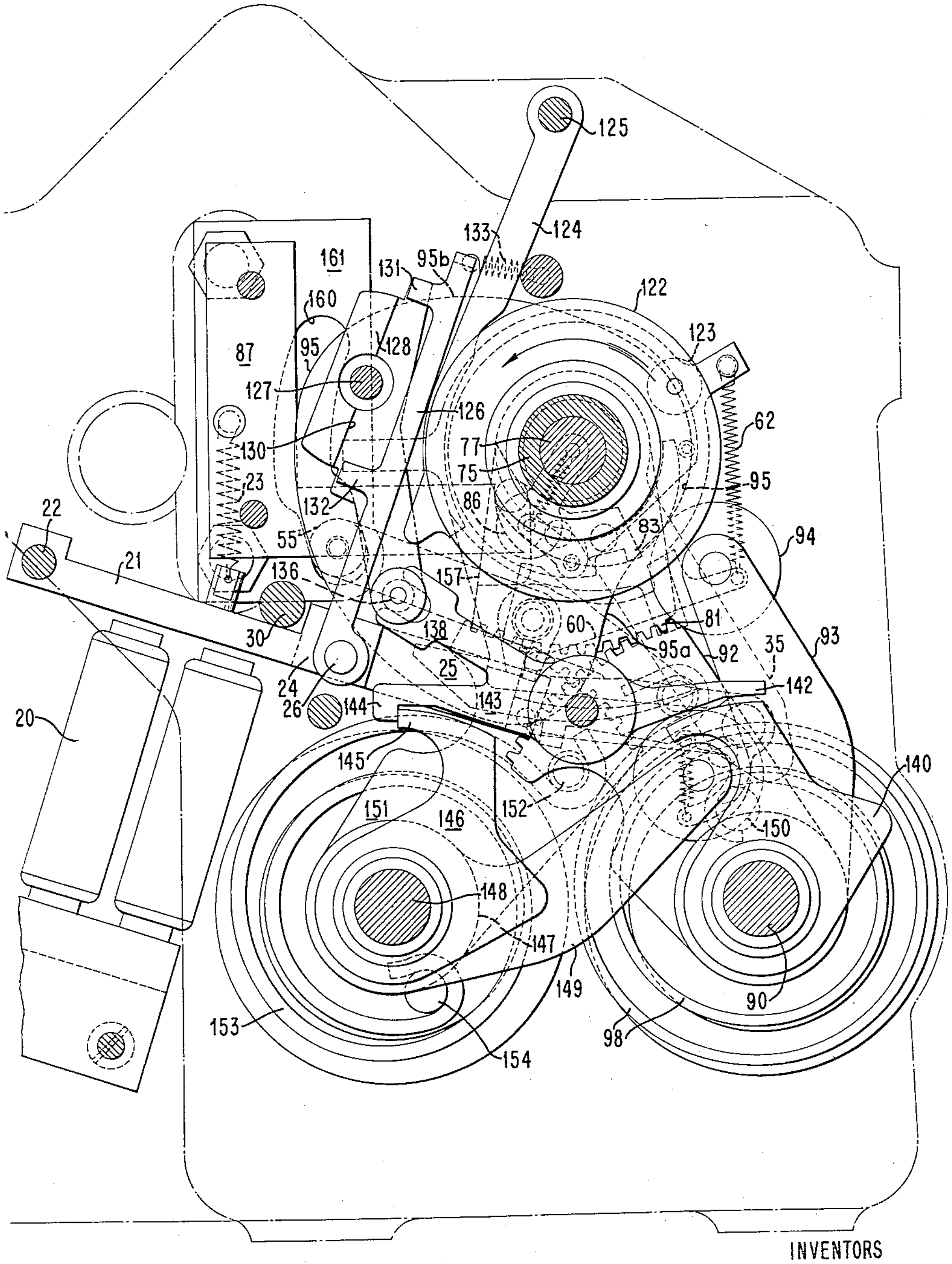
FIG. 2 is a transverse sectional view taken on the line 2—2 of FIG. 1, with the parts shown as they would be at 315° machine time, with reference to FIG. 12.

Loosely pivoted on a rod 90 (FIG. 3) is a hub 91 to which is staked on one side an upstanding segment rack 92 meshing with segment rack 81, and on the other side a follower arm 93 carrying a follower roller 94 (see FIG. 2). The roller 94 of the follower arm 93 bears continuously against a profile cam 95 secured to the constantly rotating drive shaft 75, and makes one revolution for each revolution of the main drive shaft 75. Cam 95 is shown in both FIGS. 2 and 3 as it would be just before the start of acceleration. As said cam rotates counterclockwise its roller 94 is engaged by the periphery of the cam 95 and causes movement of the segment racks 81, 92 according to the cam formations.

Figure 12:
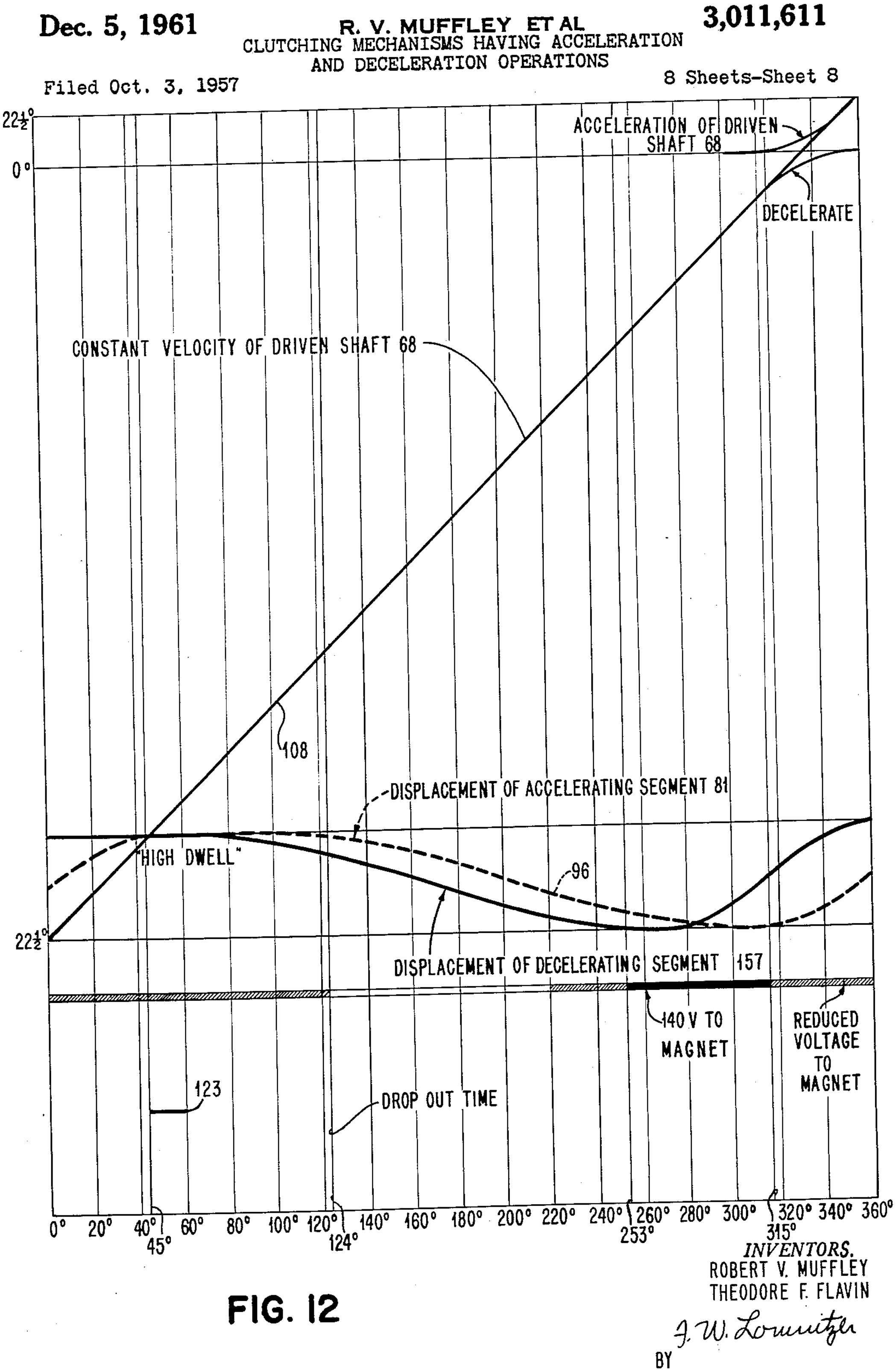
FIG. 12 is a timing diagram, combined electrical and mechanical.

The left- and righthand movement of the segment rack 81 effected by cam 95 during machine time is shown by dotted timing line 96 in the timing diagram of FIG. 12, wherein it will be seen that between 253–315°, particularly when magnet 20 has received its full energization, a dwell or concentric portion of the rotating cam 95 engages the roller 94 without imparting any substantial movement to either segment racks 81 and 92 or motion to acceleration pawl 83. It is during this time when the acceleration mechanism is practically motionless that the clutch pawl 60 is released to front the acceleration pawl 83 with the result that the drive and driven shafts are coupled without any shock or abruptness in the initial drive of the driven shaft 68. As drive shaft 75 continues to rotate, roller 94 will follow the first half of the steep cam rise 95*a* (FIG. 2) of the cam 95 now causing arm 93 to be rocked clockwise (see FIGS. 2 and 3), segment rack 92 in the same direction and segment rack 81 counterclockwise. Acceleration pawl 83 now abutting the shoulder 84 of clutch pawl 60 will cause the rotation of the disk 50 from rest, and with an increasing velocity up to the velocity of the drive shaft 75. It will be seen from FIG. 12 that the accelerated velocity of driven shaft 68 is initiated at about 315° of machine time and during 22½° of machine time the driven shaft 68 is accelerated to acquire the speed of the drive shaft 75.

To urge the roller 94 constantly against the cam 95, and to return arm 93 and segment racks 92 and 81, and connected parts to normal, said segment rack 92 carries a stud 97 (best seen in FIG. 3) about which one end of a spiral spring 98 is anchored. The other end is anchored to a fixed stud 99. Coil spring 98 has an initial wind but is further wound up as the arm 93 and segment 92 are rocked clockwise and uncoiled as they are rocked counterclockwise. The spring power causes the roller 94 to be continuously urged against the cam 95 and return segment racks 92 and 81.

After the driven shaft 68 has been accelerated from rest to the speed of the drive shaft 75 another mechanism is now rendered effective to positively couple both shafts 68 and 75 together for driving the driven shaft 68 at a speed synchronous with the drive shaft 75, as will now be described.

3. *Driving driven shaft 68 synchronously with drive shaft 75*

At the termination of the accelerated rotation of the driven shaft 68, which is when it reaches the speed of rotation of drive shaft 75, both shafts are positively coupled for further synchronous rotation until the termination of the first cycle in which acceleration occurs, or a plurality of cycles of the driven shaft 68 thereafter.

Secured to the drive shaft 77 is a drive disk 105 (see FIGS. 3–7). As best shown in FIG. 4 the projection 84 of the clutch pawl 60 is sufficiently wide so that a portion is in the plane of drive disk 105. The drive disk 105 is provided with a diagonal cut 107 which, as best shown in FIGS. 3 and 4, provides clearance to receive the projection 84 when clutch pawl 60 has been unlatched to be in the path of acceleration pawl 83.

The projection 84 is accelerated to catch up in velocity to the drive disk 105, but while this is taking place the drive disk 105 is rotating at a higher velocity and gains on projection 84. The maximum velocity of projection 84 is only equal to the constant velocity of the disk 105. When acceleration pawl 83 has accelerated plate 50 to the velocity of the drive shaft 75 and drive disk 105 has caught up with the accelerated plate 50 a clutch shoulder 106 (FIGS. 3 and 4) of drive disk 105 will strike the projection 84 of the unlatched clutch pawl 60. Thereafter, as the disk 105 continues to rotate it will, through the shoulder 106 engaging the projection 84 of clutch pawl 60, rotate the plate 50 counterclockwise, exactly as the acceleration pawl 83 did formerly, the projection 84 of the clutch pawl now being moved in a concentric path with respect to shaft 77 away from the acceleration pawl 83. It will be seen then that drive disk 105 continues the further rotation of plate 50 after 22½° of rotation as shown in FIG. 5 and at a speed concomitant with drive shaft 77. Timing line 108 in FIG. 12 indicates this uniform synchronous drive of driven shaft 68.

While the aforedescribed specific form of clutch engagement is efficient to rotate plate 50, it is desirable to provide means to positively clutch the clutch pawl 60 to the drive disk 105. To this end the disk 105 (see FIGS. 5, 6, and 7) carries a stud 110 on which is pivoted a clutch pawl 111 which is also in the plane of the projection 84 of clutch pawl 60 (see FIG. 4). An extension 113 of the clutch pawl is bent (see FIGS. 6 and 7) to pass through an opening 114 in the drive disk 105 and has connected thereto a spring 115. The other end of spring 115 is fastened to a small stud 116 tightly fitted in a central hole at the extremity of the shaft 77. Said spring normally rocks the clutch pawl 111 clockwise (FIG. 5) against a stop pin 120 carried by the drive disk 105, and furthermore acts to cause a shoulder 121 of the clutch pawl to abut the projection 84. Said shoulder 121 and the shoulder 106 of the drive disk 105 now firmly holds the projection 84 of the clutch pawl 60 at both sides to insure the clutch engagement and rotation of the driven plate 50 at synchronous speed.

During the machine operation the acceleration mechanism is utilized, the acceleration mechanism is subsequently disabled or rendered ineffective by means now to be described.

Figures 8, 9:
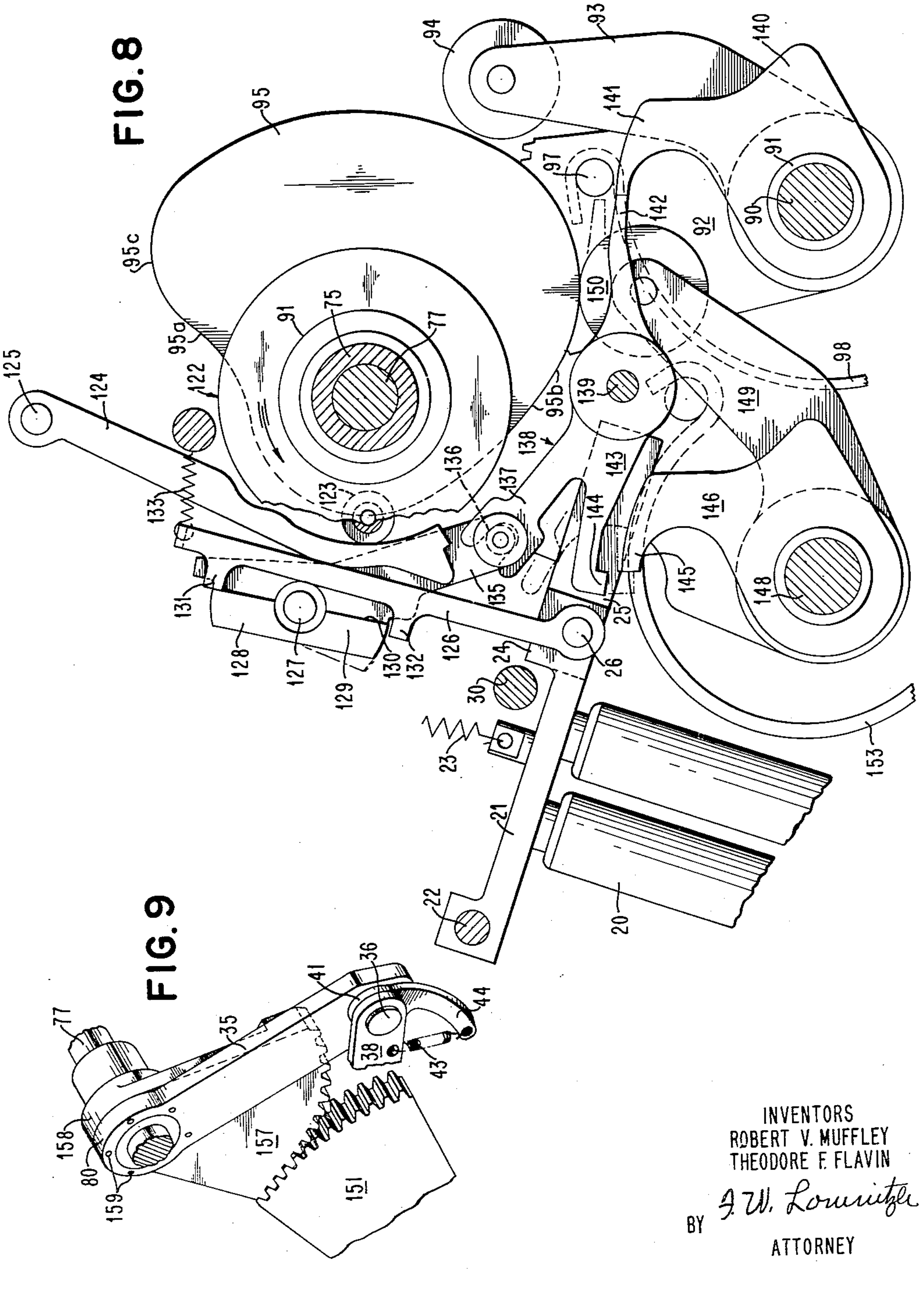
FIG. 8 is a transverse sectional view showing the control devices which are operative between 45°–60° of machine time to disable the acceleration mechanism and to render the deceleration mechanism effective.
FIG. 9 is a perspective view showing the mechanical connection between certain parts not obvious in other figures.

While the driven shaft is being rotated at constant speed the rocking of the segment rack 81 in a counterclockwise direction continues, as shown in FIG. 5, until the roller 94 reaches and is in engagement with the high dwell portion of cam 95, as is indicated in FIG. 12, at which time the follower arm 93, segment racks 92, 81 are latched in the position shown in FIG. 8 by means now to be described.

Fast to the hub 91 of the cam 95, and therefore, rotated by the drive shaft 77, is a disk 122 carrying an operating roller 123 (see FIGS. 1, 2 and 8). Said roller 123 is in the plane of an actuating arm 124 pivoted on a fixed stud 125, so as to be dependently hung from the stud 125. The arm 124 is arranged between the roller 123 and an upstanding interposer arm 126 which is pivoted on the stud 26 carried by the short tine 24 of the armature 21. Loosely pivoted on a stud 127 is a rocker arm 128 having a raised shoulder 129 whereby the edge 130 of said shoulder may abut either a pair of projections 131, 132 of the interposer arm 126.

From the timing diagram of FIG. 12 it will be evident that at about 45° of machine time when the high dwell portion of cam 95 cooperates with the roller 94 the magnets 20 are still energized, even though at a reduced voltage, rocking the armature 21 and positioning interposer arm 126 as shown in FIG. 8. As the disk 122 rotates counterclockwise roller 123 strikes actuating arm 124, rocking it clockwise about its pivot 125. Said arm 124 likewise rocks the interposer 128 about its pivot stud 127 and since the upper projection 131 is in engagement with the side edge 130 of the shoulder 129, the rocker arm 128 is rocked counterclockwise about the rod 127. It will be noted that projection 132 is free of the edge 130, and said interposer 126 is rocked against the tension of a spring 133.

A depending arm 135 of the rocker arm 128 carries a stud 136 receiving a bifurcated arm 137 of a three-armed latch member 138 whose hub is pivoted on a fixed rod 139. Secured to the hub of the follower arm 93 is a plate 140 having an arcuate latch extension 141 in the plane of a latch arm 142 of the triple-armed member 138. When the triple-armed member 138 is not rocked and in the position shown in FIG. 2 the curved latch extension 141 merely rides beneath the latch arm 142. When the high dwell portion of cam 95 has rocked the follower arm 93 and latch plate 140 to its furthermost counterclockwise position (see FIG. 8), the roller 123 actuates the train of mechanism just described to position latch arm 142 upwardly in front of the latch extension 141, in order that when follower arm 93 moves slightly to the left under control of a descending cam portion of cam 95, the latch extension 141 will abut the arm 142 and latch the cam follower in the position shown in FIG. 8. Coil spring 98 assists in the above operation.

When the triple-armed member 138 is rocked, as just described, a second integral latch arm 143 is rocked to disengage a hook 144 from the arcuate latching extension 145 of a latch plate 146, which is part of the decelerating mechanism, in order that the decelerating mechanism is caused to be effective when the magnets are not energized at pulse time, as will be described in the next section.

*Deceleration and disengagement of clutch*

The latch plate 146 is secured to a relatively wide hub 147 (see FIG. 1) loosely pivoted on a stationary rod 148. Secured to the side of said hub 147 adjacent the latch arm 146 is a follower arm 149 (FIGS. 2, 8 and 11) carrying a follower roller 150 also bearing against the cam 95 and actuated thereby according to its cam formations. Secured to the other side of the hub 147 is an upstanding segment rack 151 (FIGS. 1, 2, 5 and 10). A stud 152 is secured to segment rack 151 to which stud one end of a coil spring 153 is anchored, the other end being anchored to a fixed stud 154. This is the same arrangement as for coil spring 98, and the initial wind in the spring 153 causes the follower roller 150 to continuously bear against cam 95 and at times rock the segments 151 and 157.

The lower segment rack 151 is in the plane of and meshes with an upper segment rack 157. As best shown in FIG. 9 the segment rack 157 is secured to a hub 158 and fastened to the hub 158 of segment rack 157 by rivets 159 or welding is the hub of the arm 35, whereby arm 35 and segment rack 157 are affixed and take corresponding positions under control of cam 95.

The segment rack 157 may be designated as the decelerating segment and is positioned by cam 95, being rocked to the left or right as shown in the timing diagram of FIG. 12. Because rollers 94 and 150 engage different parts of the cam 95 at the same cycle point, the positions of racks 81 and 157 are out of phase.

In each cycle that the accelerating mechanism is latched and the decelerating mechanism is unlatched, the cam follower roller 150 and arm 149 are actuated by the torsion in spring 153 to follow, after arm 149 has been unlatched, a descending part **95*b* (FIG. 8) of cam 95. Arm 149 and segment rack 151 are rocked counterclockwise and segment rack 157 and arm 35 clockwise. At 253° of machine time segment rack 157 and arm 35 are in the upper lefthand position which is the maximum rocked position. They remain in this position due to the torsion of spring 153 as a concentric part of cam 95 acts on the roller 149**.

Since arm 35 is secured to segment rack 157 (see FIG. 9) and arm 35 has a pivot connection 36 to the bracket plate 39, the rocking of segment rack 157 and arm 35 clockwise as just described will rock the clutch initiating mechanism to function as part of the mechanism to effect disengagement of the clutch, as will now be described.

Rocking of arm 35 and segment rack 157 clockwise from the position shown in FIGS. 2, 3 and 5 will, by virtue of the pivot connection 36, urge arm 38 to the left and since spring 23 is strong enough to hold armature plate 21 firmly in the position shown in FIGS. 2, 3 and 5 against the fixed pin 30 cam segment 46 will enter curved slot 28 in the tine 25 (see FIG. 4), guiding and camming the bracket plate 39—40 and arm 38 upwardly. During this same operation roller 55 of clutch pawl release arm 56, having occupied the lower end of a slot 160 of a fixed cam plate 161, will be forced upwardly in the uppermost end of the slot 160. Lug 58 of clutch pawl release arm 56 is now in the path of the projection 59 of the clutch pawl 60 and detent arm 41 is in the path of the depending extension 51 of driven plate 50.

Figure 10:
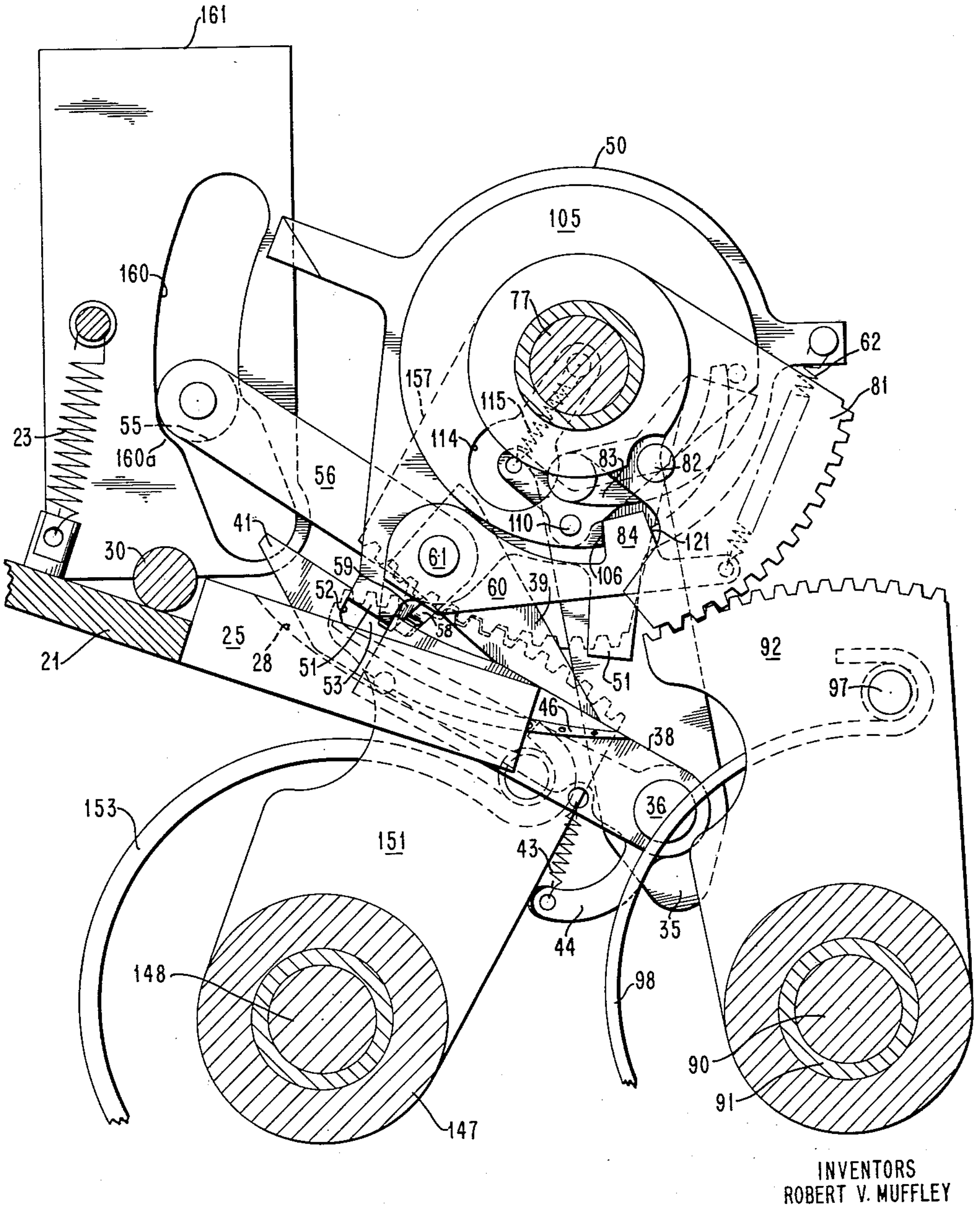
FIG. 10 is a transverse sectional view showing the position certain mechanism has assumed in readiness to declutch the driven shaft from the drive shaft if the clutch magnets are not energized.
Figure 11:
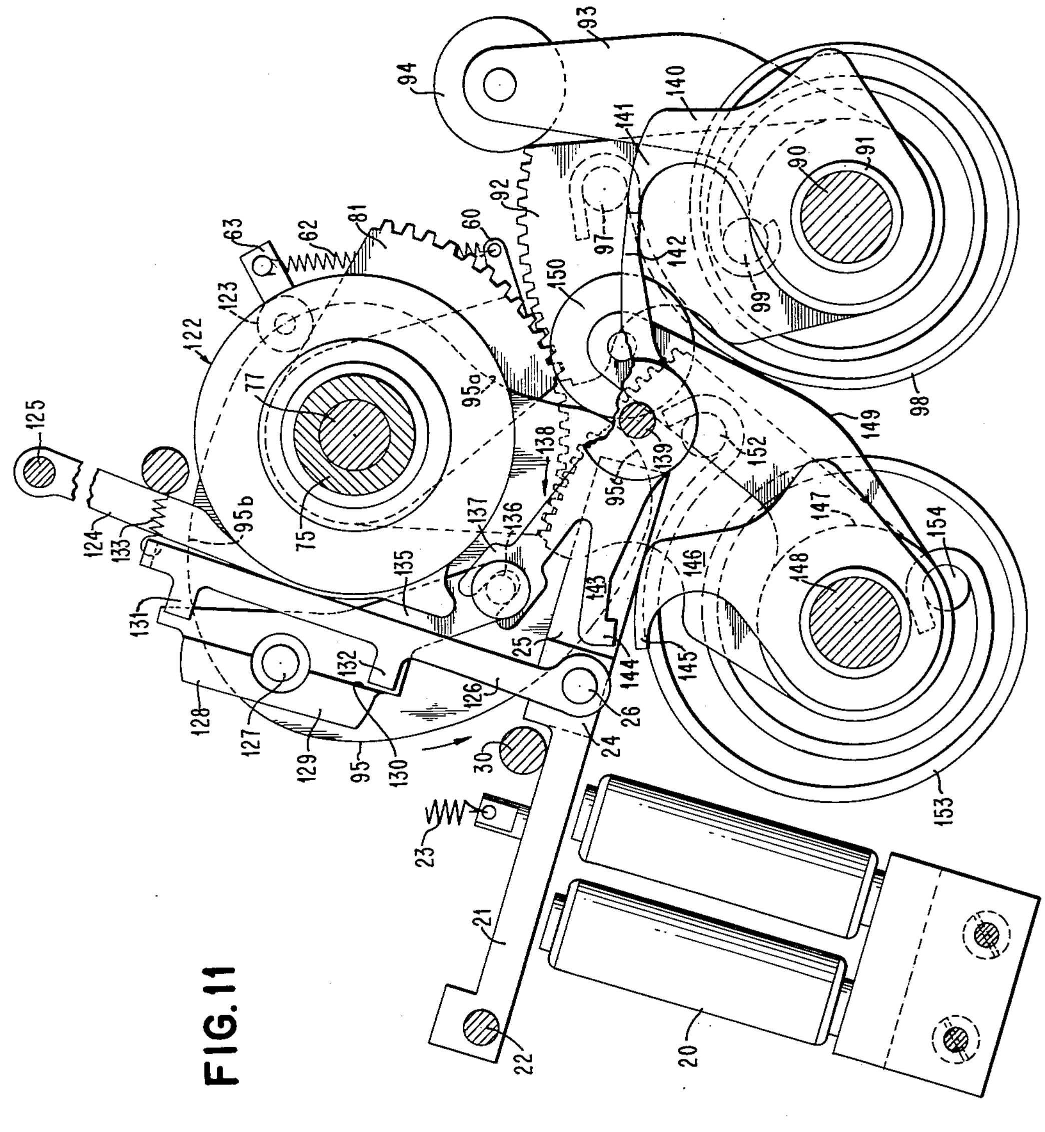
FIG. 11 is a transverse sectional view showing the latching out of the acceleration mechanism and unlatching of a cam follower which under control of an associated cam rocks segment racks utilized, shown in FIG. 10, in effecting the declutching of the driven shaft when the clutch magnets are not energized.

During the setting of the parts to the position above described, driven plate 50 is being rotated by drive disk 105 to its home position, and ultimately the depending extension 51 of the plate 50 strikes the detent arm 41 and rocks it about its pivot 36 to stretch spring 43. As depending extension 51 strikes the end of arm 38 the tension of spring 43 rocks the detent arm 41 and said plate 50 is now positively latched between the arm 38 and shoulder 52 of detent arm 41 as shown in FIG. 10. At the same time the depending extension 59 of clutch pawl 60 strikes the lug 58 of clutch release arm 56.

At just the time the above described latching operation is effected as shown in FIG. 10, the follower roller 150 engages the mid-portion of cam portion **95*a* of cam 95. As the cam 95 rotates counterclockwise between 315°–360° (see FIG. 11) segment rack 157 is rocked by cam portion 95*a* counterclockwise but at the speed of the drive shaft 75 since pawl 60 is still clutched to the drive disk 105. Roller 55 is, of course, also being drawn downwardly from a position occupying the upper end of cam slot 160 to the lowermost end of the cam slot. Roller 55 on the way down, when the velocity of the segment 157 decreases and the driven plate 50 is being restored to its home position, engages an abrupt cam portion 160*a*, rotating clutch release arm 56 clockwise about its pivot 57. Rocking of the clutch release arm 56 clockwise will cause its lug 58 which is in engagement with the extension 59 of the clutch pawl 60 to rock the latter counterclockwise against the action of the spring 62 to disengage the projection 84 of the clutch pawl 60 from the rotating drive disk 105. This disengagement takes place when roller 150 engages the beginning of the descending part 95*c* (FIG. 11) of cam 95, thus decelerating driven shaft 68 at the time the declutching takes place and disengaging shaft 68 from drive shaft 75** smoothly and without any shock.

It is intended that the driven plate 50 reach the detent arm 41 and arm 38 when the cam roller 150 is at the midpoint of the rise **95*a*. As the cam rise 95*a* becomes less steep the inertia of the load tends to cause the cam roller 150 to leave the cam 95. The heavy torsion spring 153 forces the roller 150 to follow the cam 95**, and this spring thereby supplies the decelerating force.

While not shown, a flexible detent may be utilized to impositively hold plate 50 and driven shaft 68 at home position.

Since drive shaft 75 continues to rotate, cam 95 which is driven by said shaft also continues to rotate with the following operation:

At 45° of machine time both rollers 150 and 94 are on a dwell portion of cam 95. During this time the roller 123 strikes actuating arm 124 (see FIG. 11), rocking it clockwise about its pivot 125. Said arm 124 likewise rocks the interposer 128 about its pivot stud 127 and since the lower projection 132 is now in engagement with the side edge 130 of the shoulder 129, the rocker arm 128 is rocked clockwise about the rod 127. The cooperation of projection 132 with said rocker arm is due to the fact that magnet 20 has not been energized by a pulse. Rocker arm 128 being rocked clockwise rocks the three-arm latch member 138 to cause the latch arm 142 to be disengaged from the latch extension 141, thereby unlatching the accelerating mechanism for its operation when the clutch is next engaged. Latch arm 143 is rocked downwardly so as to engage the latching extension 145 of the latch plate 146 to thereby latch the decelerating mechanism.

*Idling operations*

If in subsequent machine operations electrical impulses are not transmitted to magnet 20 there is no engagement of the clutch to effect a sequence of operations just described. However, the unlatched accelerating mechanism will permit roller 94 to follow the contour of the cam 95, continuously rocking segments 81 and 92. Segment 81 will oscillate the acceleration pawl 83 about shaft 77 but since there is no clutch connection to the driven disk 50 the latter is not rotated during idling operations of the machine.

While there have been shown and described and pointed out the fundamental novel features of the invention, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a clutch device for effecting repeated cycles of operation of a driven shaft, the combination of said driven shaft, a continuously operated drive shaft, a cam secured to said drive shaft and having an accelerating cam portion and a decelerating cam portion, an accelerating mechanism operated by said accelerating cam portion for accelerating said driven shaft from rest in the first cycle to a speed synchronous with said drive shaft, means for effecting for the first cycle of operation of the driven shaft a first clutching of said driven shaft to said accelerating mechanism, means for thereafter effecting a second clutching of said driven shaft directly to said drive shaft for the remainder of said first cycle, and thereafter for one or successive cycles of operation of the drive shaft and driven shaft at said synchronous speed, means for preventing said accelerating cam portion from being effective to operate said accelerating mechanism during said one or successive cycles of operation of said drive shaft, a decelerating mechanism operated by the decelerating cam portion of said cam, means effective to cause during the last cycle of operation of the driven shaft said decelerating cam portion of said cam to effect the operation of said decelerating mechanism to decelerate said driven shaft to rest, means to prevent said decelerating cam portion from being effective to operate said decelerating mechanism during a cycle of operation of the drive shaft following the deceleration of said driven shaft, and means operable when said decelerating mechanism is operated to disable said second clutching means to declutch said driven shaft from said drive shaft.

2. In a clutch device for effecting repeated cycles of operation of a driven shaft, the combination of said driven shaft, a continuously operated drive shaft, a cam secured to said drive shaft and having an accelerating cam portion and a decelerating cam portion, an accelerating mechanism operated by said accelerating cam portion for accelerating said driven shaft from rest in the first cycle to a speed synchronous with said drive shaft, means for effecting for the first cycle of operation of the driven shaft a first clutching of said driven shaft to said accelerating mechanism, means for thereafter effecting a second clutching of said driven shaft directly to said drive shaft for the remainder of said first cycle, and thereafter for one or successive cycles of operation of the drive shaft and driven shaft at said synchronous speed, means for disabling said accelerating mechanism for preventing said cam portion from being effective to operate said accelerating mechanism during said one or successive cycles of operation of said drive shaft, a decelerating mechanism operated by the decelerating cam portion of said cam, means effective during the last cycle of operation of the driven shaft to cause said decelerating cam portion of said cam to effect the operation of said decelerating mechanism to decelerate said driven shaft to rest, means for disabling said decelerating mechanism for preventing said decelerating cam portion from being effective to operate said decelerating mechanism during a following cycle of operation of the drive shaft, and means operable when said decelerating mechanism is operated to disable said second clutching means to declutch said driven shaft from said drive shaft.

3. In a clutch device for effecting selective operations of a driven shaft, the combination of said drive shaft, a driven shaft, a normally unlocked accelerating mechanism for accelerating said driven shaft from rest to a speed synchronous with said drive shaft, means to clutch said driven shaft first to said accelerating mechanism and then clutch said driven shaft directly to said drive shaft to drive the driven shaft at said synchronous speed, a normally locked decelerating mechanism, means for locking said accelerating mechanism against further operation after said accelerating mechanism has accelerated the driven shaft from rest and concurrently unlocking said decelerating mechanism, means operative when said driven shaft is at the end of its rotation at said synchronous speed to connect said decelerating mechanism to said driven shaft to decelerate said driven shaft to rest, means operable when said decelerating mechanism has accelerated said driven shaft to rest to declutch said driven shaft from said drive shaft, and means controlled by said drive shaft during a subsequent idle cycle of operation when said drive shaft is unclutched to the driven shaft to condition said locking means to unlock the accelerating mechanism and simultaneously lock the decelerating mechanism.

4. In a clutch device for selectively effecting an operation of a rotary driven element, the combination of said rotary driven element, a drive element, a first means rotating said driven element from a rest position to a speed synchronous with said drive element, a second means rotating said driven element thereafter at said synchronous speed, means for clutching said driven element to said first and second means in succession to bring the rotation of said driven element from rest to said synchronous speed, locking means for said first means, means operated by said drive element to cause said locking means to lock said first means against further operation when it has brought the driven element to synchronous speed, a speed reducing means driven by said drive element to reduce the speed of the driven element from said synchronous speed to rest, means operable when said speed reducing means has been operated for declutching said driven element from said drive element, and means for causing said drive element to operate said speed reducing means and said declutching means conjointly whereby said driven element is brought to rest and declutched from said drive element.

5. A selectively controlled clutch for accelerating a driven shaft from rest and then at a constant speed synchronous with a drive shaft comprising said drive shaft, a coaxially mounted driven shaft, a first clutch pawl for rotating said driven shaft, an acceleration clutch pawl, selective means to effect a relative movement of said pawls to cause said acceleration pawl to assume a drive relationship to said first pawl, an accelerating cam constantly rotated by said drive shaft for accelerating said acceleration pawl when said drive relationship has been effected to accelerate said first clutch pawl and driven shaft from rest to the speed of said drive shaft and then terminate the rotation of said driven shaft, a drive disk rotatable by said drive shaft at said constant speed and having a notch adapted to be engaged by said first clutch pawl at the termination of the accelerated rotation of the driven shaft to thereby effect further rotation of the driven shaft at constant speed synchronous with the drive shaft.

6. A multiple pawl clutch device for accelerating a driven shaft from rest to a speed synchronous with a drive shaft comprising said drive shaft being constantly rotated, a coaxially mounted driven shaft, a swingable support member mounted on said drive shaft, first acceleration clutch pawl on said support member, a second support member fixed to said driven shaft, a second clutch pawl on said second support member, selective means to effect a relative movement of said clutch pawls to cause said acceleration pawl to assume a drive relationship with said second clutch pawl, an accelerating cam driven by said drive shaft to be constantly rotated therewith, and means controlled by said accelerating cam for swinging said support member to cause said acceleration clutch pawl when said drive relationship has been effected to rotate said driven shaft at accelerated speed from rest to a speed synchronous with the drive shaft, said cam having an initial idle cam portion ineffective to move said swingable support member to enable the drive relationship to be effected while the acceleration clutch pawl is at rest and thereby effect a shockless clutching operation.

7. In a multiple pawl clutch device, a drive shaft, a driven shaft, means including a first clutch pawl for rotating said driven shaft, an acceleration clutch pawl, selective means to cause said acceleration clutch pawl to effect a clutching driving relationship with said first clutch pawl, and an accelerating mechanism including a cam rotatable by said drive shaft for moving said acceleration clutch pawl, when the clutching driving relationship has been effected, to cause said first clutch pawl to acceleratingly rotate said driven shaft according to the contour of the cam, said cam having an initial idle cam contour ineffective to move said acceleration pawl to enable said accelerating clutch pawl to effect a clutching driving relationship with said first clutch pawl while the driven shaft is at rest to start the drive of said driven shaft without abruptness and shock.

8. In a multiple pawl clutch device, a drive shaft, a driven shaft, means including a first clutch pawl for rotating said driven shaft, an acceleration clutch pawl, means to effect a clutching driving relationship between said acceleration clutch pawl and said first clutch pawl, a cam rotatable by said drive shaft, means under control of said cam for causing said acceleration pawl when the clutching driving relationship has been effected to accelerate said driven shaft from rest to the speed of the drive shaft, said cam having means initially ineffective to move said acceleration pawl to enable said driven shaft to be clutched to the drive shaft while at rest and without abruptness and shock, and further means to cause said first clutch pawl to be directly connected to the drive shaft independent of said acceleration pawl to rotate said driven shaft at a speed synchronous with said drive shaft.

9. In a multiple pawl clutch device, a drive shaft, a driven shaft, a first clutch pawl, a second clutch pawl, selective means to effect an interlocking clutch relationship between said pawls, means connecting said first clutch pawl to said driven shaft to rotate said driven shaft, an accelerating mechanism driven by said drive shaft including said second clutch pawl for accelerating the rotation of said driven shaft from rest to the speed of the drive shaft, and timing means to cause the interlocking clutch relationship by said selective means while said driven shaft is at rest to thereby effect a shockless clutching connection to the drive shaft.

10. In a multiple pawl clutch device, a drive shaft, a driven shaft, a first clutch pawl, a second clutch pawl, selective means to effect an interengaging clutch relationship between said pawls, means connecting said first clutch pawl with said driven shaft to rotate said driven shaft, an accelerating mechanism driven by said drive shaft including said second clutch pawl for accelerating the rotation of said driven shaft from rest to the speed of the drive shaft, and means for thereafter driving said driven shaft at the speed of said drive shaft comprising a rotating drive disk secured to said drive shaft and having a clutch notch adapted to receive to said first clutch pawl when said driven shaft aquires the speed of the drive shaft.

References Cited in the file of this patent

UNITED STATES PATENTS

| | | |
|---|---|---|
| 2,633,957 | Gardiner et al. | Apr. 7, 1953 |
| 2,744,600 | Kohles et al. | May 8, 1956 |
| 2,777,552 | Flavin | Jan. 15, 1957 |
| 2,784,817 | Lessman | Mar. 12, 1957 |